March 13, 1928.

P. BURKE ET AL 1,662,635

AUTOMATIC BRAKE

Filed Sept. 15, 1926

INVENTORS
Paul Burke
Arthur Orloff
Charles French
BY
ATTORNEYS.

March 13, 1928.

P. BURKE ET AL

AUTOMATIC BRAKE

Filed Sept. 15, 1926

INVENTORS
Paul Burke
Arthur Orloff
BY
Charles Freick
ATTORNEYS.

Patented Mar. 13, 1928.

1,662,635

UNITED STATES PATENT OFFICE.

PAUL BURKE AND ARTHUR ORLOFF, OF GREEN BAY, WISCONSIN, ASSIGNORS TO NORTHWEST ENGINEERING CORPORATION, OF GREEN BAY, WISCONSIN, A CORPORATION OF WISCONSIN.

AUTOMATIC BRAKE.

Application filed September 15, 1926. Serial No. 135,627.

The invention relates to automatic brakes, and more particularly to brakes of this type used in connection with hoisting apparatus.

Where an automatic brake is associated with a hoisting drum when the drum is turned to wind in the hoisting cable the brake is automatically released but when the drum rotates in the opposite direction the brake is automatically applied and to permit of the paying out of the hoisting cable under the influence of the load means under the control of the operator are provided to release the automatic brake, and the object of the present invention is to improve brake mechanism of this character by providing a single spring for initiating the tension in the brake member which spring tension is relieved by the operator to permit of the controlled release of the brake and further to provide for a complete release of the brake by relieving the live end of the band of the spring tension.

The invention further consists in the several features hereinafter described and more particularly defined by claims at the conclusion hereof.

In the drawings Fig. 1 is a side elevation view of brake mechanism embodying the invention;

Figure 1:
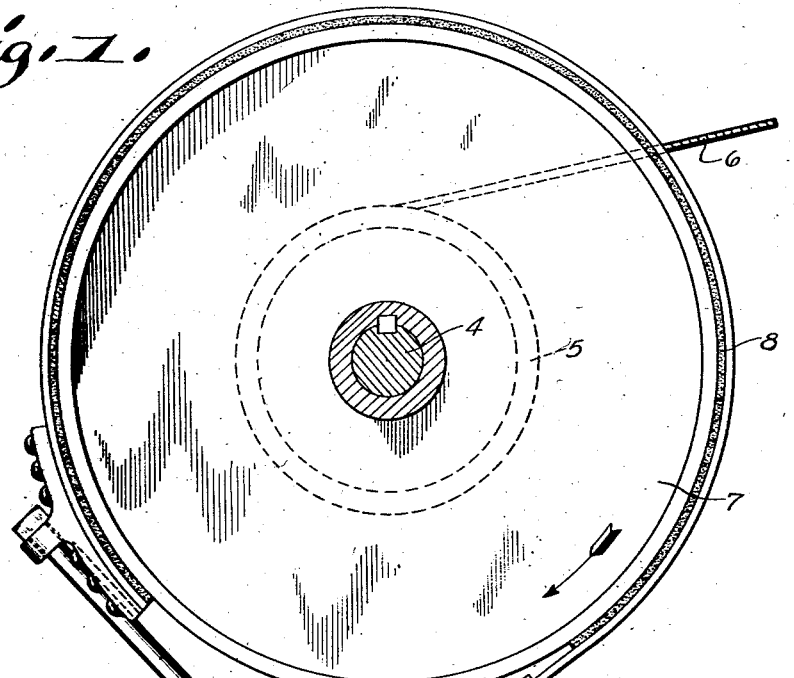
Figure 4:
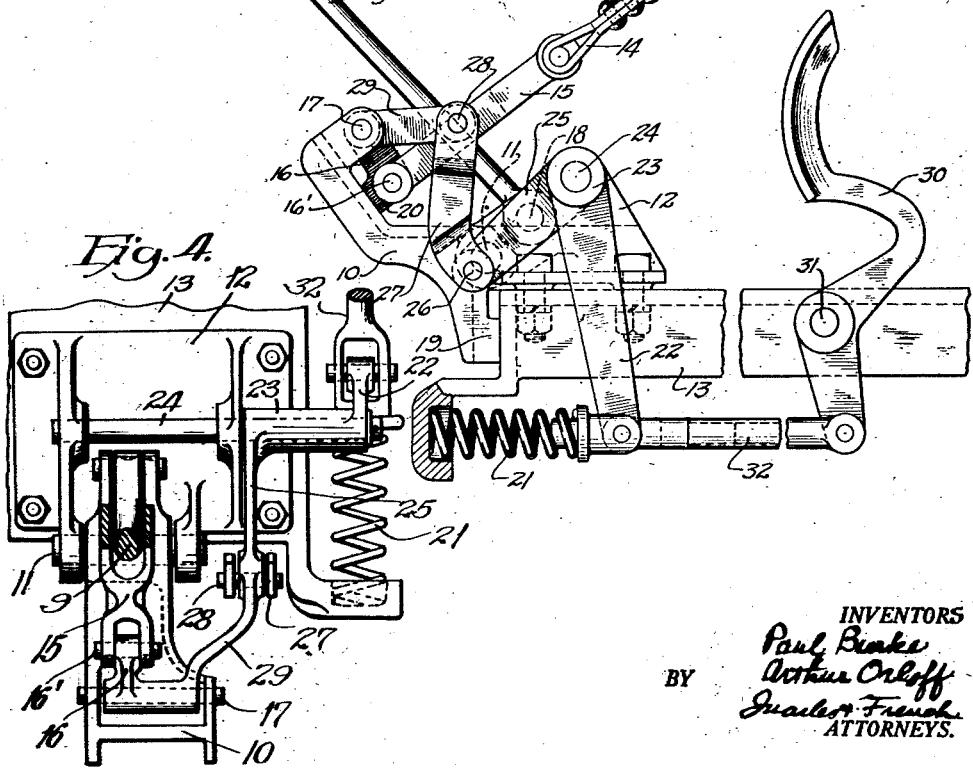
Fig. 4 is a detail sectional view taken on the line 4—4 of Fig. 2.
Figure 2:
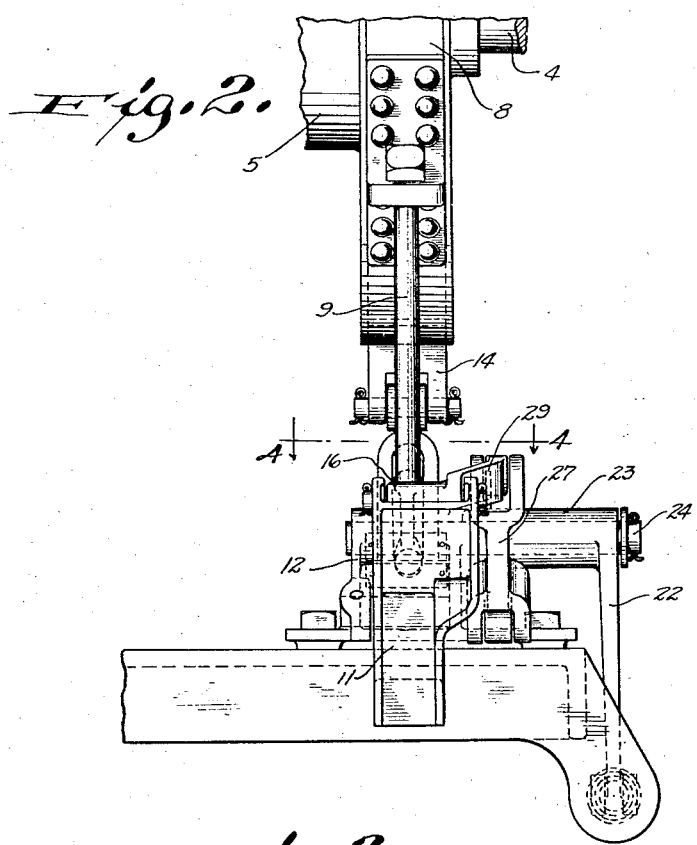
Fig. 2 is an end elevation view thereof.
Figure 3:
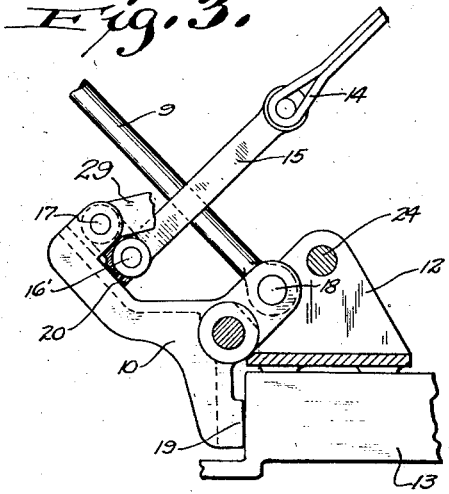
Fig. 3 is a detail view of parts of the brake mechanism.

In the drawings the numeral 4 designates a power shaft having a hoist drum 5 thereon upon which the hoist line 6 is mounted, and 7 the brake drum associated with the hoist drum.

A brake member 8 in the form of a band is connected at its dead end by an eyebolt 9 to an oscillatory member 10, here shown in the form of a bell-crank lever pivotally mounted on a shaft 11 secured to a bracket 12 associated with a fixed frame member 13. The live end 14 of the brake member 8 is connected by a link 15 to one arm of a bell-crank lever 16 which is pivotally connected by pin 17 to one arm of the member 10. The distance of the pin 16' from the shaft 11 is greater than the distance of the pin 18 at the dead end of the band from the shaft 11. The member 10 is also provided with a stop projection 19 engageable with the end of the frame 13 to limit the swinging movement in one direction, and a stop projection 20 is also provided on the lever 16 engageable with the member 10 to effect a complete automatic release of the drum, as hereinafter described.

For putting tension upon the band a single spring 21 is interposed between the frame 13 and one arm 22 of a bell-crank lever 23 which is pivoted on a pin 24 associated with the bracket 12 and has its other arm 25 provided with a pin 26 connected by a link 27 and a pin 28 to the arm 29 of the lever 16. A bias to the brake mechanism in the direction of engagement is effected by offsetting the center of articulation defined by pin 26 to the left of the fixed pivot point 11 of the lever 10 so that the spring 21 imposes a continuous slight tendency on member 10 to rotate it in a brake-applying direction which, as here shown, is anti-clockwise.

As a means, under the control of the operator, for releasing the brake we have shown a foot-pedal 30 pivoted at 31 and connected by a link 32 with the arm 22 of the lever 23.

With this construction when the drum 5 is rotated anti-clockwise the tension in end 9 is less than that in end 14 and under these conditions the lever 10 will swing upwardly, thus releasing the band and allowing free rotation of the drum in a direction to wind in the cable 6.

When the drum 6 is rotated in a clockwise direction, the pedal 30 being free, the tension in end 9 exceeds that in end 14 and the lever 10 swings down or in an anti-clockwise direction until stop 19 comes into contact with the frame 13, the pull of the end 14 of the band being then resisted by the pressure of spring 21 acting through lever 23, link 27 and lever 16. For ordinary loads, that are within the capacity of spring 21, this movement of the lever 10 will cause the brake to be applied tightly to the drum and hence automatically stop rotation in a direction in which the cable is paid out.

With the brake applied and holding a load, tending to rotate the drum in a clockwise direction, if pressure be applied to the foot-pedal in amount sufficient to cause compression of spring 21, then lever 16, acted upon by the spring through link 27 and lever 23, will cause the end 14 of the band to move toward the drum, thus releasing the brake and allowing the drum to rotate in a clockwise direction and hence permit the cable 6 to pay out and allow the load to descend.

When under conditions of anti-clockwise rotation the lever 10 swings upwardly or in a clockwise rotation to release the brake and due to the reaction of spring 21 upon the lever 23, link 27 and lever 16, the end 20 of said lever 16 abuts against the lever 10 and moves with it so as to effect a complete automatic release of the brake from the drum.

Furthermore, the offsetting of the center of pin 26 relative to the center of oscillation of lever 10 and to the left thereof enables the spring 21 to impose a continuous tendency to rotate the lever 10 in a downward or anti-clockwise direction tending to apply the brake thus giving a bias to the brake mechanism in the direction of engagement.

From the foregoing description it will be noted that when through clockwise rotation of the drum the lever 10 swings upwardly the brake will be automatically applied and that independent movement of the lever 16 will then release the brake, and that when the drum rotates in the opposite direction the brake is automatically released by the movement of both of the levers 10 and 16, the abutting engagement between said levers under these conditions causing a complete automatic release.

We desire it to be understood that this invention is not to be limited to any particular form or arrangement of parts except in so far as such limitations are specified in the claims.

What we claim as our invention is:

1. In an automatic brake, the combination with a brake drum and a brake band therefor, of a pair of members movable relative to each other and having the brake band associated therewith whereby the band is automatically applied by the movement of one of said members and independently released by the movement of the other member, and means for moving both members together to effect a complete automatic release of said brake band.

2. In an automatic brake, the combination with a brake drum and a brake band therefor, of a pair of members movable relative to each other and having the brake band associated therewith whereby the band is automatically applied by the movement of one of said members and independently released by the movement of the other member, and means for tensioning the band including connections to one member offset relative to those of the other member to bias the brake mechanism in the direction of engagement.

3. In an automatic brake, the combination with a brake drum and brake band therefor, of a pair of members movable relative to each other and having the brake band associated therewith whereby the band is automatically applied by the movement of one of said members and independently released by the movement of the other member, of means for effecting the movement of said last-named member to release the brake, and a spring associated with said means and acting therethrough upon said members to effect the normal tensioning of the brake band.

4. In an automatic brake, the combination with a brake drum and brake band therefor, of a pair of pivoted levers pivotally connected together and separately connected to the ends of the band whereby the band is automatically applied by the movement of one of said levers and independently released by the movement of the other lever, said last-named lever having abutting engagement with said first-named lever to cause both levers to move together to effect a complete automatic release of said band from said drum when rotating in a direction opposite to that producing engagement.

5. In an automatic brake, the combination with a brake drum and a brake band therefor, of a pair of pivoted levers pivotally connected together and separately connected to the ends of the band whereby the band is automatically applied by the movement of one of said levers and independently released by the movement of the other lever, a spring associated with said last-named lever for tensioning the brake, and manually-operated means for relieving said tension of said spring and independently moving said last-named lever.

In testimony whereof, we affix our signatures.

PAUL BURKE.
ARTHUR ORLOFF.